Feb. 14, 1933.  H. A. REINHART ET AL  1,897,277
VEHICLE
Filed Dec. 21, 1931  3 Sheets-Sheet 1
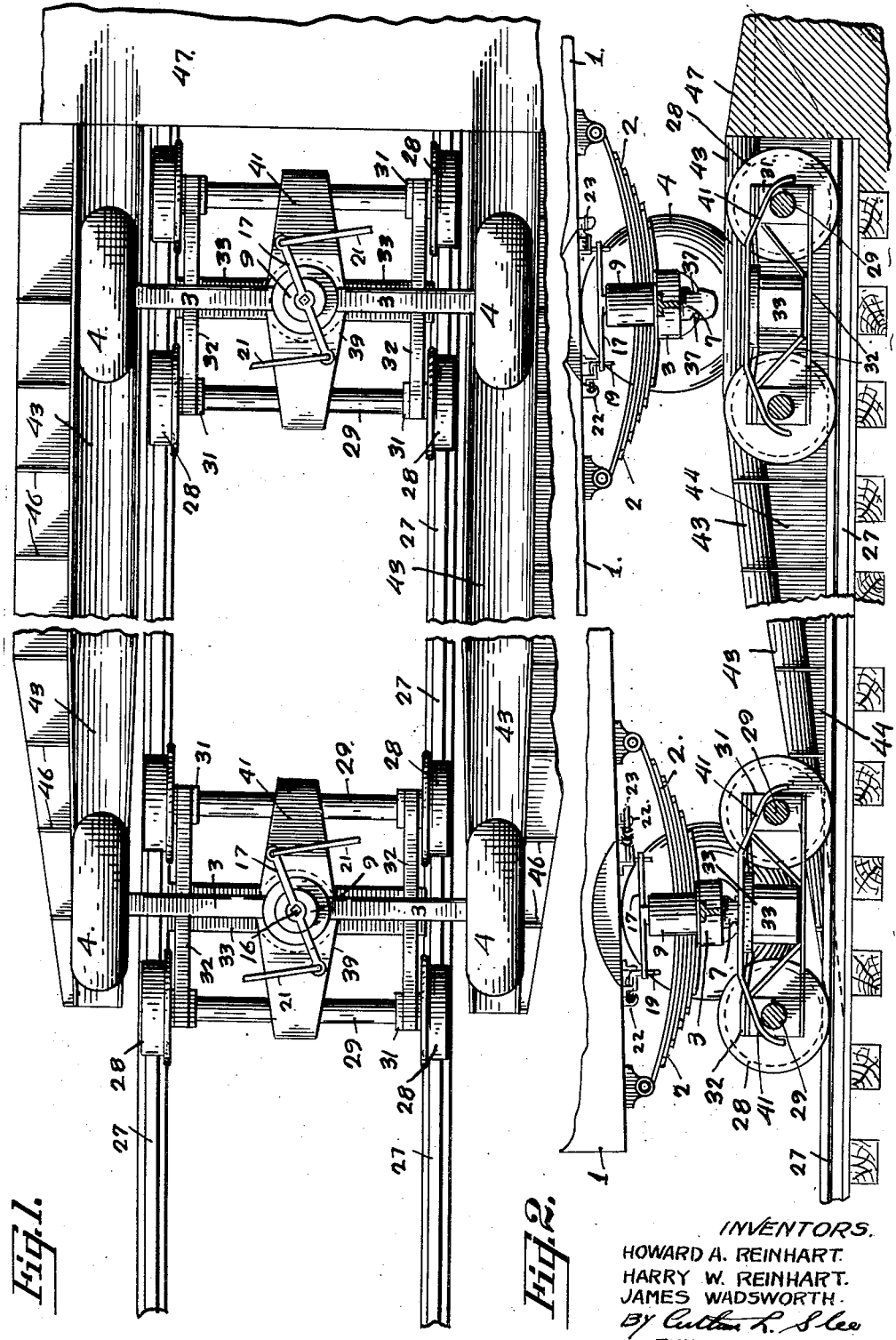
INVENTORS.
HOWARD A. REINHART.
HARRY W. REINHART.
JAMES WADSWORTH.
THEIR ATTORNEY.

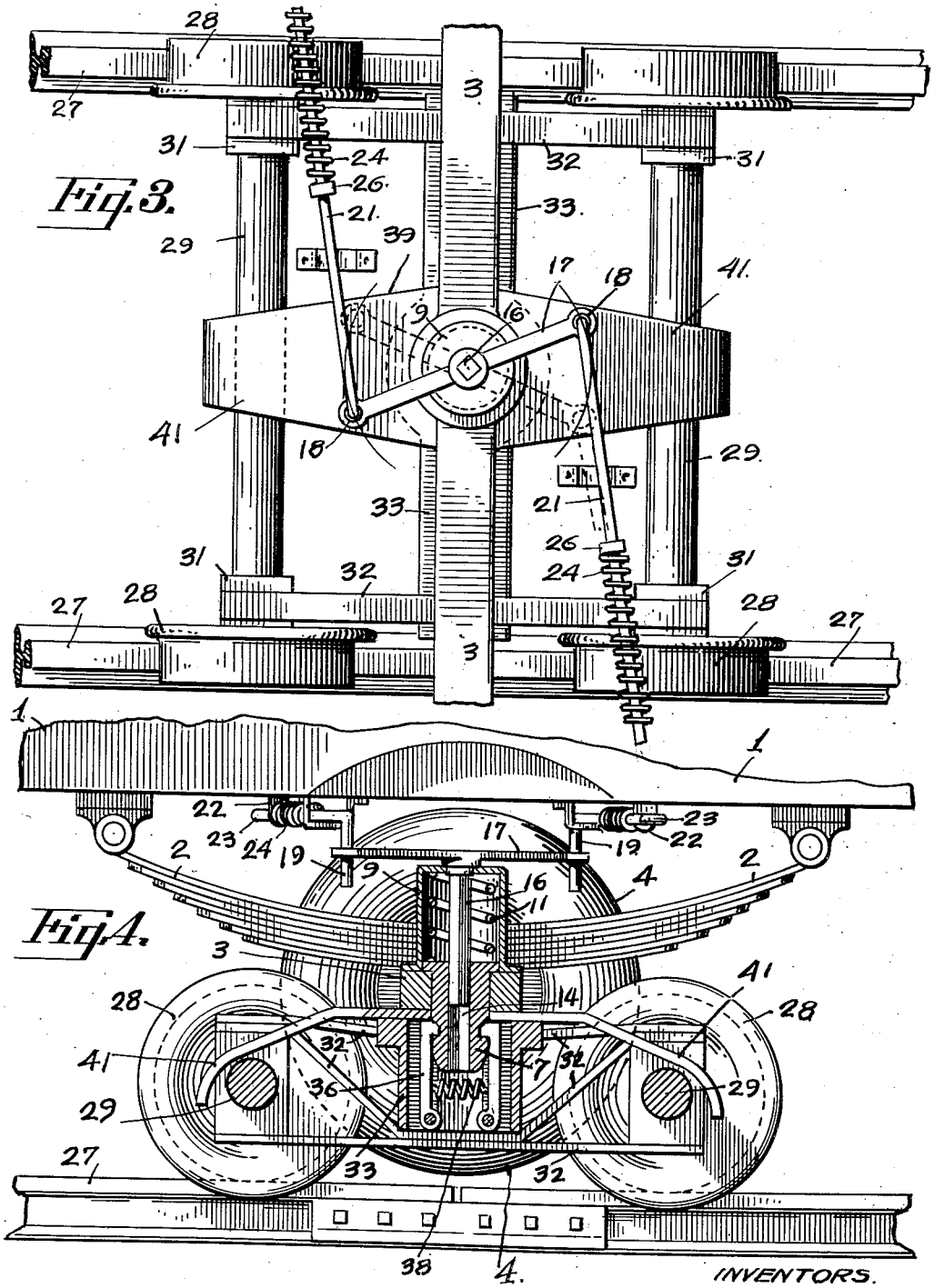

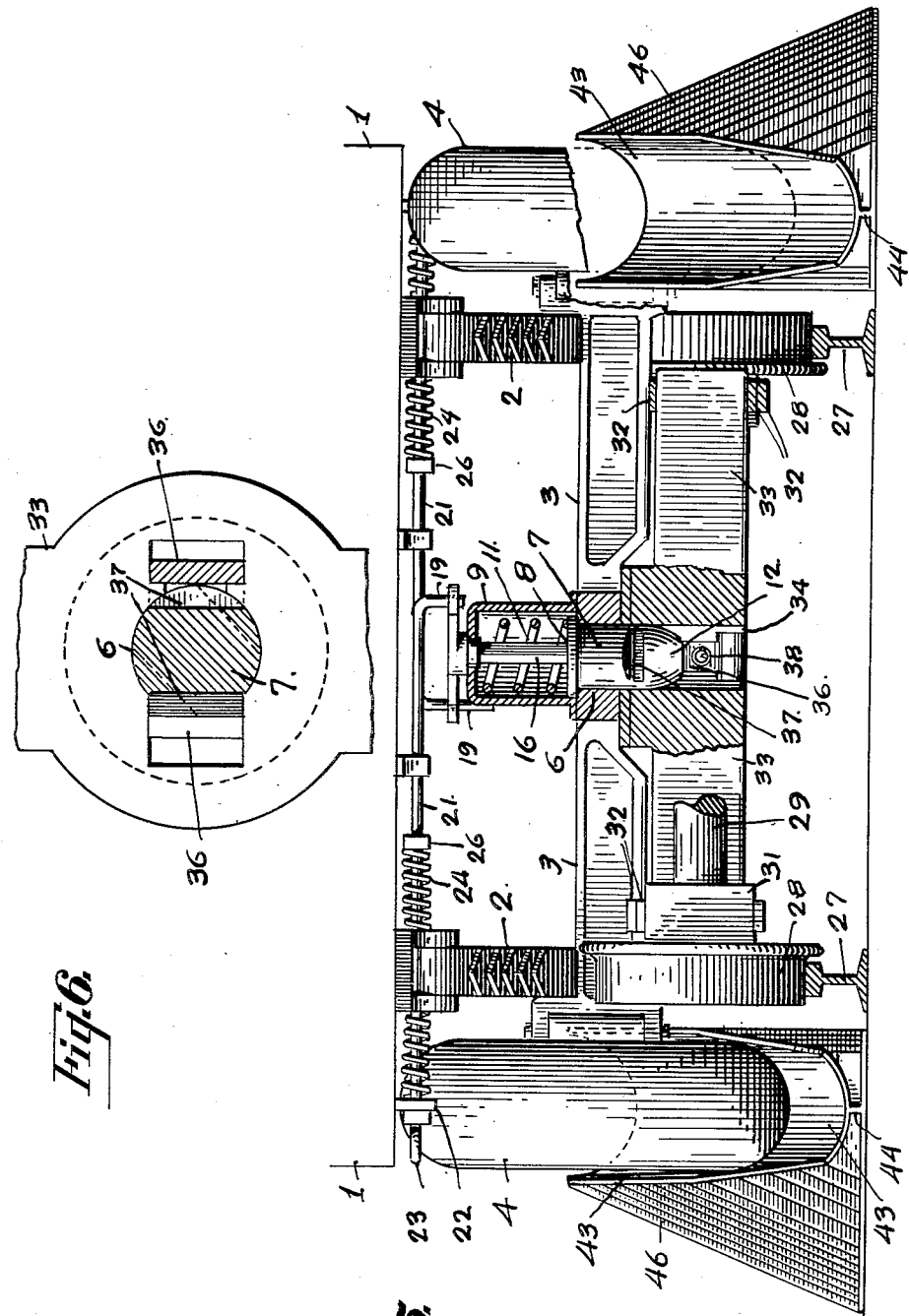

Patented Feb. 14, 1933

1,897,277

UNITED STATES PATENT OFFICE

HOWARD A. REINHART AND HARRY W. REINHART, OF OAKLAND, AND JAMES WADSWORTH, OF BERKELEY, CALIFORNIA

VEHICLE

Application filed December 21, 1931. Serial No. 582,328.

Our invention relates to improvements in vehicles and running gear therefor, wherein said vehicle is provided with means for detachably engaging a pair of rail trucks mounted upon the rails of a rail system and operates in conjunction with means for moving said vehicle into, or out of, engagement with said trucks whereby said vehicle may be transported upon its own running gear over highways or upon said trucks over a rail system, without being unloaded.

The primary object of the present invention is to provide a new and improved vehicle.

Another object is to provide a new and improved vehicle having improved means for transporting the same over highways or over a rail system.

A further object is to provide new and improved means for moving said vehicle into and out of engagement with one or more rail trucks as said trucks and vehicle are moved along rails supporting said trucks.

A still further object is to provide a vehicle having running gear provided with the usual spring supports for said vehicle, and provided with improved means for mounting said vehicle upon springless rail trucks so that said vehicle may remain spring supported upon springless trucks, thereby permitting the elimination of springs in said trucks.

A still further object of the present invention is to provide improved means for easily moving king pins on the vehicle into engaging relation with apertures provided for their reception within said trucks.

A still further object is to provide a new and improved vehicle of the character set forth having improved means for detachably engaging rail trucks, as well as improved means for releasing said engaging means.

We accomplish these and other objects by means of the improved device disclosed in the drawings forming a part of the present application wherein like characters of reference are used to designate similar parts throughout the specification and drawings, and in which—

Fig. 1 is a broken plan view of the running gear of the vehicle mounted upon the rail trucks, the vehicle being removed;

Fig. 2 is a side elevation of the same with certain parts removed;

Fig. 3 is an enlarged broken view of one axle of the running gear of the vehicle mounted upon a rail truck;

Fig. 4 is a vertical longitudinal sectional view of the truck with the vehicle mounted thereon, the near wheel of said vehicle being removed;

Fig. 5 is an end elevation, partly in section, of the vehicle mounted upon the truck and the inclines for moving said vehicle into and out of engagement with said truck;

Fig. 6 is a detail sectional view of the king pin and cooperating latches.

Referring to the drawings the numeral 1 is used to designate in general a vehicle which may be a motor vehicle or a trailer therefor. The vehicle 1 is supported in the usual manner by springs 2 mounted upon the running gear axle 3, which axle 3 is provided with the usual wheels 4.

The axle 3 is also provided with a centrally disposed aperture 6 within which is slidably and rotatably mounted a king pin 7 having a flanged head 8, to limit its downward movement. A housing 9 is mounted over the aperture 6 and pin 7 therein and a suitable spring 11 is interposed between the inner top of said housing 9 and the head 8 of the pin 7, said pin being thus rendered resiliently recedable, the purpose of which will hereinafter be more fully set forth.

The king pin 7 is provided with a tapered end 12 and a square centrally disposed aperture 14 within which is slidably mounted a vertically disposed square shank 16 whose upper end extends exteriorly of the housing 9 and is provided with oppositely extending levers 17 having their outer ends apertured as at 18 thru which apertures are slidably mounted lateral extensions 19 of horizontally disposed rods 21, the outer ends of said rods 21 extending thru brackets 22 and being provided with suitable handles 23. A spring 24 is interposed between each bracket 22 and a stop 26 mounted on each rod 21, said mechanism constituting a releasing mechanism, the purpose of which will hereinafter be more fully set forth and described.

Parallel rails 27 have mounted thereon the wheels 28 of what we term a rail truck comprising the usual axles 29 and inboard bearings 31 connected by struts 32 to support a body bolster 33 having a centrally disposed king pin aperture 34 to receive the king pin 7 of the vehicle 1.

Within this central king pin aperture 34 is mounted a pair of dogs or latches 36, as disclosed in Fig. 4 of the drawings, said latches 36 being normally held in engaging relation with notches 37 upon opposite sides of the king pin 7 by a spring 38, so that when the said king pin 7 is registered with the aperture 34 of the body bolster 33 the tension of the spring 11 within the housing 9, assisted by the attraction of gravity, will move the beveled end 12 of the pin 7 between said latches 36 until said latches engage the notches 37 in said king pin 7.

Mounted centrally of the rail truck and extending in opposite directions is a baffle plate 39 having inclined portions 41 extending beyond the axles 29 of said truck, as disclosed in Figs. 2 and 4 of the drawings, the purpose of which will hereinafter be more fully set forth.

Mounted adjacent the rails 27 and preferably parallel thereto we have provided inclined run-ways 43 preferably trough like in construction. The troughs 43 are preferably supported by longitudinally disposed central webs 44 supported at regular intervals by transverse buttresses 46.

These inclines 43 are provided preferably at the end of a track, altho opposite inclines may be provided so that one end of the vehicle may be elevated to disengage it from the truck, after which the truck may be removed from the locality before the opposite truck of the vehicle is moved to the top of said opposite incline.

In the present instance, however, we have illustrated the inclines 43 as being at the end of the track or rails 27 and said inclines 43 lead to a suitable ramp 47 and to which the said vehicle 1 may be moved by said inclines 43.

In operation, the vehicle 1 is moved from the ramp 47 onto the inclines 43 and as the forward axle 3 of the vehicle 1 is moved down the incline, a rail truck is moved therewith, with the aperture 34 thereof registering as nearly as possible with the king pin 7 of the vehicle 1. Or, if the truck is left in receiving position, as the king pin 7 approaches said truck, the tapered end 12 of the king pin 7 will be engaged and receded against the tension of the spring 11 by the inclined portion 41 of the baffle plates 39 until the king pin 7 registers with the aperture 34 of the body bolster 33 when the tension of the spring 11 and the attraction of gravity will move said king pin 7 into said aperture 34 until the pawls 36 engage the notches 37 of said king pin 7 and thereby normally retain the running gear of the vehicle 1 rotatably in engaging relation with the rail truck upon the rails 27.

The opposite end of the vehicle 1 is now moved to engage the second one of a pair of rail trucks in a similar manner whereby said vehicle may be transported over a rail system in conjunction with other vehicles similarly mounted and connected, as in the usual freight train system, without unloading or transferring the freight or other contents of the vehicle 1.

At the end of the rail portion of the trip the vehicle 1 is moved onto a pair of inclines in the opposite direction and just before the wheels 4 of the vehicle 1 engage the inclines 43, one of the handles 23 on either side of the vehicle 1 is pulled outwardly against the tension of the spring 24 which will rotate the arms 17, square shank 16, and the king pin 7 until the full diameter of the same between the notches 37 pushes back the upper ends of the pawls or latches 36 against the tension of the spring 38 so that the king pin 7 may be removed as the vehicle 1 is moved upwardly on the incline to disengage said rail truck. The opposite truck and releasing mechanism is operated in the same manner until both rail trucks are disengaged from the vehicle 1 and it is then moved onto the ramp 47 after which one or more trailers may be connected to a source of motive power and transported over highways without unloading or otherwise interfering with the contents of the vehicle.

It should be particularly noted that, inasmuch as springs 2 are provided to resiliently support the vehicle 1 upon its running gear or wheels 4, the rail truck may be springless for the reason that the axles 3 of the vehicle 1 rest directly upon said rail truck and the springs 2 being interposed between said axle 3 and vehicle 1 continue to resiliently support the load of said vehicle 1 over the rail system, as well as when said vehicle is operating upon a highway. By means of this novel arrangement the cost of providing springs for the rail truck is eliminated.

It should also be noted that the axle 3 of the vehicle 1 is not only supported centrally of its length by the center of the body bolster 33, but that the struts 32 of the rail truck also support the said axle 3 at points beyond its center, as disclosed in Fig. 5 of the drawings, said point of contact of the axle 3 of the vehicle 1 with said struts 32 readily permitting relative movement between the axle 3 and the body bolster 33, as when the rail trucks are rounding a curved portion of the rail system.

Having thus described our invention what we claim as new and desire to secure by Letters Patent is—

1. The combination with a vehicle and running gear thereof, of a rail truck; means for detachably connecting said rail truck to said vehicle; and means mounted upon said vehicle for normally preventing detachment of said truck from said vehicle and manually operable to permit such detachment.

2. The combination with a vehicle and the running gear thereof, of a pair of rail trucks; rails for supporting said trucks; means for detachably engaging said vehicle with said trucks whereby the same may be transported over a rail system; a pair of inclines mounted adjacent to said rails for engaging said vehicle and moving the same into and out of engagement with said trucks whereby said vehicle may be transported upon the running gear thereof, or over said rail system; and means mounted upon said trucks for normally preventing disengagement of the vehicle from said trucks.

3. The combination with a vehicle and the running gear thereof, of a pair of rail trucks; rails for supporting said trucks; means for detachably engaging said vehicle with said trucks whereby the same may be transported over a rail system; a pair of inclines mounted adjacent to said rails for engaging said vehicle and moving the same into and out of engagement with said trucks whereby said vehicle may be transported upon the running gear thereof, or over said rail system; means mounted upon said trucks for normally preventing disengagement of the vehicle from said trucks; and means mounted upon the vehicle for releasing said disengagement preventing means.

4. The combination with a vehicle and the running gear thereof, of a pair of rail trucks each provided with a central king pin aperture; king pins mounted upon the running gear of said vehicle and detachably engaging said apertures in said trucks whereby said vehicle may be transported upon said rail trucks over a rail system and removed from said trucks and transported upon its own running gear; means for normally preventing detachment of said king pins from said apertures; and means for releasing said detachment preventing means.

5. The combination with a vehicle and the running gear thereof, of a pair of rail trucks each provided with a centrally disposed king pin aperture; rails supporting said trucks; normally projecting and resiliently recedable king pins mounted upon said running gear and detachably engaging said apertures; and inclines mounted adjacent said rails for moving said vehicle and the king pins thereon into and out of engagement with the apertures in the truck as said vehicle and trucks are moved over said rails, whereby said vehicle may be transported over highways on its own running gear or over a rail system on said trucks.

6. The combination with a vehicle and the running gear thereof, of a pair of rail trucks each provided with a centrally disposed king pin aperture; rails supporting said trucks; normally projecting and resiliently recedable king pins mounted upon said running gear and detachably engaging said apertures; inclines mounted adjacent said rails for moving said vehicle and the king pins thereon into and out of engagement with the apertures in the truck as said vehicle and trucks are moved over said rails, whereby said vehicle may be transported over highways on its own running gear or over a rail system on said trucks; and means for receding said pins when said vehicle is moved to prevent interference of said pins with said trucks.

7. The combination with a vehicle and the running gear thereof, of a pair of rail trucks each provided with a centrally disposed king pin aperture; rails supporting said trucks; normally projecting and resiliently recedable king pins mounted upon said running gear and detachably engaging said apertures; inclines mounted adjacent said rails for moving said vehicle and the king pins thereon into and out of engagement with the apertures in the truck as said vehicle and trucks are moved over said rails, whereby said vehicle may be transported over highways on its own running gear or over a rail system on said trucks; and inclined baffle plates mounted upon said trucks for receding said pins when said vehicle is being moved on said inclines to engage said trucks to prevent improper engagement of said pins with said trucks.

8. The combination with a vehicle and the running gear thereof, of a pair of rail trucks each provided with a centrally disposed king pin aperture; rails supporting said trucks; normally projecting and resiliently recedable king pins mounted upon said running gear and detachably engaging said apertures; inclines mounted adjacent said rails for moving said vehicle and the king pins thereon into and out of engagement with the apertures in the truck as said vehicle and trucks are moved over said rails, whereby said vehicle may be transported over highways on its own running gear or over a rail system on said trucks; and detachable engaging means for normally preventing disengagement of said king pins from the apertures of the trucks.

9. The combination with a vehicle and the running gear thereof, of a pair of rail trucks each provided with a centrally disposed king pin aperture; rails supporting said trucks; normally projecting and resiliently recedable king pins mounted upon said running gear and detachably engaging said apertures; inclines mounted adjacent said rails for moving said vehicle and the king pins thereon into and out of engagement with the apertures in the truck as said vehicle and trucks are moved over said rails, whereby said vehicle may be transported over highways on its own running gear or over a rail system on said trucks; and means for releasing said engaging means.

In witness whereof, we hereunto set our signatures.

HOWARD A. REINHART.
HARRY W. REINHART.
JAMES WADSWORTH.